(12) United States Patent
Hissam

(10) Patent No.: US 9,334,010 B2
(45) Date of Patent: *May 10, 2016

(54) MOTORCYCLE HANDLEBAR WITH SHOCK ABSORBER

(71) Applicant: FASST COMPANY, Washington, UT (US)

(72) Inventor: Dan Hissam, Sun City, CA (US)

(73) Assignee: Fasst Company, Washington, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/290,037

(22) Filed: May 29, 2014

(65) Prior Publication Data

US 2014/0366679 A1   Dec. 18, 2014

Related U.S. Application Data

(63) Continuation of application No. 12/129,524, filed on May 29, 2008, now Pat. No. 8,739,653, which is a continuation of application No. 11/367,002, filed on Mar. 2, 2006, now abandoned, which is a continuation (Continued)

(51) Int. Cl.
*B62K 21/16* (2006.01)
*B62K 21/14* (2006.01)
*B62K 21/26* (2006.01)

(52) U.S. Cl.
CPC .................. *B62K 21/16* (2013.01); *B62K 21/14* (2013.01); *B62K 21/26* (2013.01); *Y10T 74/2078* (2015.01); *Y10T 74/20786* (2015.01); *Y10T 74/20792* (2015.01); *Y10T 74/20798* (2015.01)

(58) Field of Classification Search
CPC .... Y10T 74/2078; Y10T 74/20792–74/20822; Y10T 74/20786; B62K 21/16; B62K 21/14; B62K 21/12; B62K 21/22; B62K 21/08; B62B 11/14; B62B 1/12
See application file for complete search history.

(56) References Cited

U.S. PATENT DOCUMENTS

| 402,143 | A | 4/1889 | Colling |
| 442,532 | A | 12/1890 | McGlinchey |
| 1,448,921 | A | 3/1923 | Ershkowitz |
| 1,719,007 | A | 7/1929 | Gazda |
| 2,358,738 | A | 9/1944 | Schwinn |
| 2,583,947 | A | 1/1952 | Keetch |
| 4,420,989 | A | 12/1983 | Finkle |

(Continued)

FOREIGN PATENT DOCUMENTS

| DE | 60622 | 11/1891 |
| DE | 828 061 | 1/1952 |

(Continued)

OTHER PUBLICATIONS

EPO Translation of Description of DE 29615741 U1, Dec. 19, 1996.*

*Primary Examiner* — Daniel Yabut
(74) *Attorney, Agent, or Firm* — Knobbe, Martens, Olson & Bear, LLP

(57) ABSTRACT

A handlebar assembly including a pair of handgrip portions extending outwardly from a mounting portion and configured for generally vertical, arcuate movement relative to the mounting portion. One or more shock absorbing arrangements may be provided to produce a force tending to resist downward movement of the handgrip portions. Desirably, the handgrip portions are adjustable in height relative to the mounting portion.

17 Claims, 6 Drawing Sheets

Related U.S. Application Data of application No. 11/057,693, filed on Feb. 14, 2005, now abandoned, which is a continuation of application No. 10/319,408, filed on Dec. 12, 2002, now Pat. No. 6,860,500.

(60) Provisional application No. 60/340,647, filed on Dec. 13, 2001.

(56) References Cited

U.S. PATENT DOCUMENTS

| | | | |
|---|---|---|---|
| 4,625,264 A | 11/1986 | Nagashima | |
| 4,939,950 A | 7/1990 | Girvin | |
| 5,121,652 A | 6/1992 | Morrone | |
| 5,163,339 A | 11/1992 | Giard et al. | |
| 5,186,074 A | 2/1993 | Arnold | |
| 5,241,881 A | 9/1993 | Chen | |
| 5,435,204 A | 7/1995 | Marui | |
| 5,467,665 A | 11/1995 | Huang | |
| 5,511,444 A | 4/1996 | Clausen et al. | |
| 5,660,406 A | 8/1997 | Menze | |
| 5,685,201 A | 11/1997 | Renshaw | |
| 5,752,711 A | 5/1998 | Moreau | |
| 6,325,402 B1 | 12/2001 | Gogo et al. | |
| 6,647,823 B2 | 11/2003 | Tsumiyama et al. | |
| 6,748,821 B1 | 6/2004 | Smith | |
| 6,860,500 B2 | 3/2005 | Hissam | |
| 2003/0033900 A1 | 2/2003 | Chu | |
| 2006/0162484 A1 | 7/2006 | Liao | |

FOREIGN PATENT DOCUMENTS

| | | |
|---|---|---|
| DE | 296 15 741 | 12/1996 |
| DE | 29615741 U1 * | 12/1996 |
| DK | 38871 | 6/1928 |
| FR | 660526 | 7/1929 |
| FR | 2747095 | 10/1997 |
| IT | 399838 | 11/1942 |
| IT | 426390 | 10/1947 |
| JP | 08099665 | 4/1996 |

* cited by examiner

MOTORCYCLE HANDLEBAR WITH SHOCK ABSORBER

INCORPORATION BY REFERENCE TO ANY PRIORITY APPLICATIONS

Any and all applications for which a foreign or domestic priority claim is identified in the Application Data Sheet as filed with the present application are hereby incorporated by reference herein and made a part of the present disclosure.

BACKGROUND

1. Field

The present invention relates generally to handlebar assemblies for vehicles such as motorcycles and all-terrain vehicles (atv's). More specifically, the present invention relates to an improved handlebar assembly, including a shock absorbing arrangement.

2. Description of the Related Art

Motorcycles and atv's, among other vehicles, commonly incorporate a handlebar assembly to assist in the steering of the vehicle. The handlebar assembly is usually mounted to the front wheel through a front suspension assembly. The handlebar is often an elongated, tubular member that extends in a generally lateral direction and includes a handgrip portion at each end, for a rider of the vehicle to grasp. Such an arrangement also provides a means of support for a portion of the rider's body weight, especially when in a standing position.

In the case of off-road motorcycles and atv's, the vehicle is likely to traverse rough terrain, including jumps, on a regular basis. Unless adequately absorbed, forces imparted on the vehicle due to the rough nature of the terrain may be transmitted to the rider through the handlebar assembly and foot rests, or footpegs, of the motorcycle. This may cause undesirable fatigue and result in the rider having reduced control of the vehicle. Such a situation is especially undesirable in motorcycle or atv racing, in which maintaining a consistent pace throughout the event is necessary in order to be competitive.

In order to absorb at least a portion of the impact forces caused by traversing rough terrain, motorcycles and ATVs are commonly equipped with front and rear suspension assemblies operably positioned between the front and rear wheel, or wheels, and the main body of the vehicle. Such suspension assemblies, due to inherent design constraints, are only capable of absorbing impact forces within a finite range of magnitude and/or frequency. Accordingly, impact forces outside of this range may be transmitted to the rider of the vehicle, through the handlebar assembly, despite the proper functioning of the front and rear suspension assemblies. For example, an impact force having an amplitude large enough to fully compress either, or both, of the front and rear suspension assemblies may result in the remainder of the force being transmitted to the rider. In other situations, an impact force having a high frequency may not be adequately absorbed by the suspension assemblies, often due to internal friction inherent to common shock absorber designs, which may be caused by sealing arrangements and/or movement of hydraulic fluid.

Accordingly, some prior handlebar assemblies have been designed to possess a certain amount of flexing movement. For example, the handlebar may be made from a material that possesses inherent flexibility to absorb at least a portion of the impact forces that would otherwise be transmitted to the rider. More recently, handlebars have been produced with a varying wall thickness to encourage flexing of the outer ends, or handgrip portions, of the handlebar. However, manipulation of the handlebar material in order to create a varying wall thickness causes the final product to be expensive. Furthermore, in order to maintain the necessary strength of the handlebar assembly, the flex of the handgrip portions is necessarily limited to a small amount of movement and, thus, a small amount of shock absorbing capability.

Finally, with this type of handlebar arrangement, the direction of movement during flexing of the handgrip portions is not controlled. That is, the handgrip portions are permitted to flex in all directions. Accordingly, the amount of advantageous, shock absorbing flex (i.e., generally downward flex of the handgrip portions) is limited by the amount of flex that is permissible in the other directions while still providing a handlebar assembly having a solid feel. As a result, the amount of shock absorbing flex permitted in these types of handlebar assemblies is compromised by the need for the handlebar assembly to provide a solid feel when a rider is pulling in an upward or backward direction on the handgrip portions, which is common during acceleration of the motorcycle or atv.

SUMMARY

As motorcycle and atv technology has advanced, so has the performance capabilities of these vehicles. As a result, motorcycle and atv riders are jumping higher and farther than ever before and traversing bumps at greater speeds than have previously been possible. Accordingly, a need exists for an improved handlebar assembly having a greater degree of shock and vibration absorbing movement. Preferably, a preferred embodiment of the handlebar assembly permits tuning of the shock absorbing arrangement to suit an individual rider's preference and/or the terrain conditions to be encountered. In addition, desirably, a preferred embodiment of the handlebar assembly permits adjustability of at least a portion of the handlebar's geometry, such as the height of the handgrip portions, for example.

A preferred embodiment is a motorcycle handlebar assembly including a clamp tube defining a handlebar axis. The clamp tube is sized and shaped to be secured to a motorcycle by a handlebar clamp arrangement. An elongated first handgrip portion is pivotally connected to the clamp tube at a first pivot assembly and extends outwardly from the clamp tube. The first pivot assembly substantially constrains movement of the first handgrip portion to vertical, arcuate movement about a first pivot axis disposed generally perpendicular to the handlebar axis. The first pivot axis is desirably spaced above the handlebar axis. An elongated second handgrip portion is pivotally connected to the clamp tube at a second pivot assembly and extends outwardly from the clamp tube. The second pivot assembly substantially constrains movement of the second handgrip portion to vertical, arcuate movement about a second pivot axis, disposed generally perpendicular to the handlebar axis. The second pivot axis is desirably spaced above the handlebar axis. The handlebar assembly also includes a first stop and a second stop. The first stop is configured to limit upward movement of the first handgrip portion and the second stop is configured to limit upward movement of the second handgrip portion. At least one shock absorber is configured to provide a force resisting downward movement of the first and second handgrip portions.

A preferred embodiment involves a motorcycle handlebar assembly including a mount portion configured to be connected to a front suspension assembly of a motorcycle. An elongated first handgrip portion is pivotally connected to the clamp portion at a first pivot assembly for rotation about a first pivot axis and extends outwardly from the clamp portion. The first pivot assembly includes a first stop positioned below the first pivot axis and defining a relaxed height of the first handgrip portion relative to the clamp portion. The first stop is configured to prevent upward movement of the first handgrip portion. An elongated second handgrip portion is pivotally connected to the clamp tube at a second pivot assembly for rotation about a second pivot axis and extends outwardly from the clamp tube. The second pivot assembly includes a second stop positioned below the second pivot axis and defining a relaxed height of the second handgrip portion relative to the clamp portion. At least one shock absorber is configured to bias the first and second handgrip portions into the relaxed height and provides a force tending to resist downward movement of the first and second handgrip portions. Each of the first and second stops are configured to permit adjustment of the relaxed height of the first and second handgrip portions.

A preferred embodiment involves a motorcycle handlebar assembly including a clamp tube defining a handlebar axis. The clamp tube is sized and shaped to be secured to a motorcycle by a handlebar clamp arrangement. An elongated first handgrip portion is pivotally connected to the clamp tube at a first pivot assembly for rotation about a first pivot axis. The first handgrip portion extends outwardly from the clamp tube. The first pivot assembly includes a stop defining a relaxed height of the first handgrip portion relative to the clamp tube. The stop is adjustable to permit adjustment of the relaxed height of the first handgrip portion without disassembly of the handlebar assembly. An elongated second handgrip portion is pivotally connected to the clamp tube at a second pivot assembly for rotation about a second pivot axis. The second handgrip portion extends outwardly from the clamp tube. The second pivot assembly includes a stop defining a relaxed height of the second handgrip portion relative to the clamp tube. The stop is adjustable to permit adjustment of the relaxed height of the second handgrip portion without disassembly of the handlebar assembly. At least one shock absorber is configured to provide a force resisting downward movement of the first and second handgrip portions.

A preferred embodiment involves a motorcycle handlebar assembly including a clamp tube defining a handlebar axis and being sized and shaped to be secured to a motorcycle by a handlebar clamp arrangement. A first support extends upward from a first end of the clamp tube and supports a first shaft. The first shaft defines a first pivot axis spaced above and being generally perpendicular to the handlebar axis. A second support extends upward from a second end of the clamp tube and supports a second shaft. The second shaft defines a second pivot axis spaced above and generally perpendicular to the handlebar axis. An elongated first handgrip portion is pivotally supported on the first shaft and extends outwardly from the first support. The first handgrip portion is substantially constrained to vertical, arcuate movement about the first pivot axis. An elongated second handgrip portion is pivotally supported on the second shaft and extends outwardly from the second support. The second handgrip portion is substantially constrained to vertical, arcuate movement about the second pivot axis. A first shock absorber is positioned between the first support and the first handgrip portion to provide a force resisting downward movement of the first handgrip portion. A second shock absorber is positioned between the second support and the second handgrip portion to provide a force resisting downward movement of the second handgrip portion.

BRIEF DESCRIPTION OF THE DRAWINGS

These and other features, objects and advantages of the present handlebar assembly are described in greater detail with reference to drawings of a preferred embodiment, which is intended to illustrate, and not to limit, the present invention. The drawings contain six figures.

DETAILED DESCRIPTION

The present invention finds utility with a number of vehicles, including, without limitation, motorcycles, all-terrain vehicles (atv's), personal watercraft, snowmobiles and other types of vehicles in which handlebar assemblies are commonly employed to assist in steering of the vehicle. The illustrated embodiment of the handlebar assembly, however, is particularly well-suited for use with an off-road motorcycle. The description of a preferred handlebar assembly 28 in the context of an off-road motorcycle, therefore, is merely exemplary and is not intended as a limitation of the present invention, unless expressly so claimed.

Figure 1:
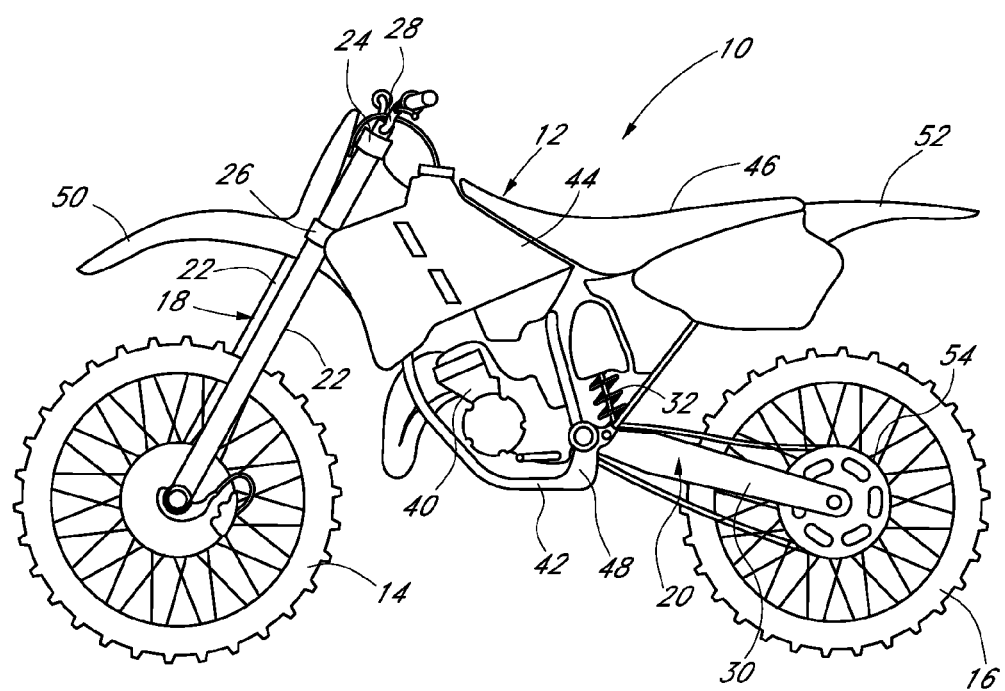
FIG. 1 is a side elevational view of an off-road motorcycle incorporating a preferred handlebar assembly.

With reference to FIG. 1, an off-road motorcycle, generally referred to by the reference numeral 10, is shown and includes a body portion 12 and front and rear wheels 14, 16. The front and rear wheels 14, 16 are supported relative to the body portion 12 by front and rear suspension assemblies 18, 20. The front and rear suspension assemblies 18, 20 are configured to support and control movement of the front and rear wheels 14, 16, respectively, throughout a suspension travel path.

Desirably, the front suspension assembly 18 comprises a telescopic front fork assembly having a pair of telescopically engaged fork legs 22 extending along each side of the front wheel 14. The fork legs 22 are connected to the body portion 12 of the motorcycle 10 by upper and lower fork clamps 24, 26. Thus, the front wheel 14 moves along a substantially linear suspension travel path generally parallel to the fork legs 22. Movement of the front wheel 14 occurs against resistance offered by a shock absorber arrangement incorporated within the fork legs 22, as is known in the art. Desirably, a handlebar assembly 28 is connected to the front suspension assembly 18 to permit rotation of the front suspension assembly 18 and front wheel 14 about a steering axis. The handlebar assembly 28 is described in greater detail below.

Preferably, the rear suspension assembly 20 comprises a swingarm 30 pivotally connected to the body portion 12 of the motorcycle 10 and supporting the rear wheel 16 near its rearward end. The swingarm 30 may extend along one, or both, sides of the rear wheel 16. A shock absorber 32 is positioned between the swingarm 30 and the body portion 12 of the motorcycle 10 to provide a force tending to resist rotation of the swingarm 30 and, thus, movement of the rear wheel 16 throughout an arcuate suspension travel path, as is known in the art.

The body portion 12 of the motorcycle 10 desirably comprises an engine 40 supported within a frame 42, the latter commonly being constructed from a plurality of metal tubes welded together. The frame 42 also supports a fuel tank 44 and an elongated, straddle-type seat assembly 46 on which a rider of the motorcycle 10 may sit. A pair of foot pegs 48 (only one shown) are connected to each side of a lower portion of the frame 42 and are configured to provide support for the feet of a rider of the motorcycle 10. Front and rear fenders 50, 52 are supported above the front and rear wheels 14, 16 and are configured to deflect dirt, mud or other debris that might be projected upward by the wheels 14, 16.

The rear wheel 16 is drivingly connected to the engine 40 by a chain and sprocket drive assembly 54. However, other suitable drive arrangements may also be used, such as a belt drive or shaft drive arrangement, for example. The motorcycle 10 has been described in general detail to assist the reader's understanding of the illustrated handlebar assembly 28. Other components of the motorcycle 10 may be considered as conventional and, therefore, additional details are not considered necessary for one of ordinary skill to practice the present invention.

Figure 2:
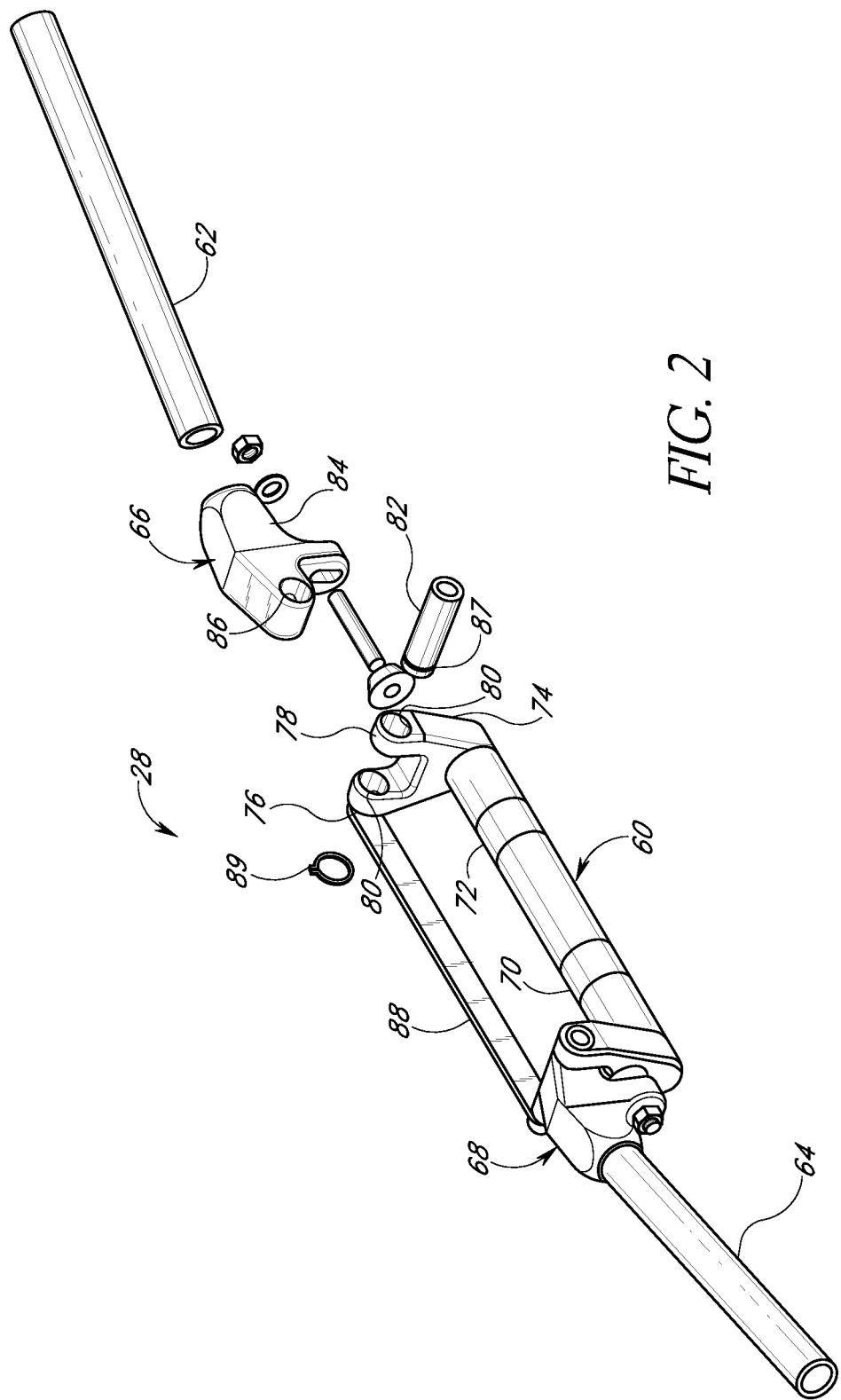
FIG. 2 is a perspective view of the handlebar assembly of FIG. 1, the right side of the handlebar being in an exploded condition. The handlebar includes a clamp tube, right and left handgrip portions extending from the clamp tube and right and left pivot assemblies connecting the handgrip portions to the clamp tube.

With reference to FIG. 2, the handlebar assembly 28 is illustrated removed from the motorcycle 10, for the purpose of clarity. Generally, the handlebar 28 includes a mounting portion 60 with a right handgrip portion 62 and a left handgrip portion 64 extending to right and left sides, respectively, of the mounting portion 60, when viewed from the perspective of a person sitting on the motorcycle 10. Right and left pivot assemblies 66, 68, respectively, support the right and left handgrip portions 62, 64 relative to the mounting portion 60 and, preferably, are configured to constrain movement of the right and left handgrip portions 62, 64 to substantially vertical, arcuate movement from a normal, or relaxed, position to a compressed position. In addition, the pivot assemblies 66, 68 preferably are also configured to provide a force tending to resist downward movement of the handgrip portions 62, 64. Accordingly, the handlebar assembly 28 is configured to provide shock absorption in addition to the shock absorption provided by the front and rear suspension assemblies 18, 20.

In the illustrated embodiment, a mounting portion 60 of the handlebar assembly 28 comprises a tubular member, or clamp tube, which is configured to be secured to the upper fork clamp 24 (FIG. 1) by a standard handlebar clamp arrangement (not shown). A standard handlebar clamp arrangement typically includes a pair of clamp members fixed to the upper fork clamp 24 and spaced on opposing sides of the steering axis of the motorcycle 10. Each clamp member usually includes an upper and lower portion, which cooperate to define a cavity for receiving the clamp tube 60. Fasteners, such as bolts, typically connect the upper and lower portions and permit a clamping force to be applied to the clamp tube 60. In some arrangements, the upper and/or lower portions may be interconnected, to provide additional rigidity to the clamp arrangement. Even with such an arrangement, however, the clamp tube 60 is still primarily clamped only at a pair of spaced locations along the clamp tube 60.

When a standard clamp arrangement, as described immediately above, is used, the mounting portion 60, or clamp tube, is received by the clamp arrangement at a pair of spaced apart locations 70, 72 on the outer surface of the clamp tube 60. Such an arrangement provides beneficial leverage and inhibits deflection of the handlebar assembly 28 when a large force is required to turn the front wheel 14, such as when cornering at high speeds. The outer surface of the spaced locations 70, 72 may be knurled to improve the grip of the clamp arrangement on the clamp tube 60. Preferably, the locations are at least two and one-half inches apart and, more preferably, about four inches apart.

Desirably, the right and left handgrip portions 62, 64 are constructed of tubular members and are supported at a height relatively higher than the clamp tube 60. The difference in height between the clamp tube 60 and the outer ends of the handgrip portions 62, 64 (i.e., where they are normally grasped by a rider of the motorcycle 10) is referred to as the "rise" of the handlebar assembly 28. The rise permits the handgrip portions 62, 64 to be at a comfortable height relative to the clamp tube 60, the height of which is determined primarily by the position of the upper end of the front fork legs 22. In addition, the handgrip portions 62, 64 may extend outward at a rearward angle relative to the clamp tube 60, which is referred to as the "sweep" of the handlebar assembly 28. The rise and sweep of the handlebar assembly 28 may be altered to suit different size or type of vehicles, different riding conditions or individual rider preferences.

As described above, the pivot assemblies 66, 68 support the handgrip portions 62, 64 relative to the clamp portion 60 and, desirably, also constrain the movement of the handgrip portions 62, 64 to substantially vertical, arcuate movement. Preferably, each pivot assembly 66, 68 incorporates a shock absorbing arrangement to provide a force tending to resist downward movement of the handgrip portions 62, 64. In FIG. 2, the right pivot assembly 66 is illustrated in an exploded condition, for the purpose of clarity.

Figure 3:
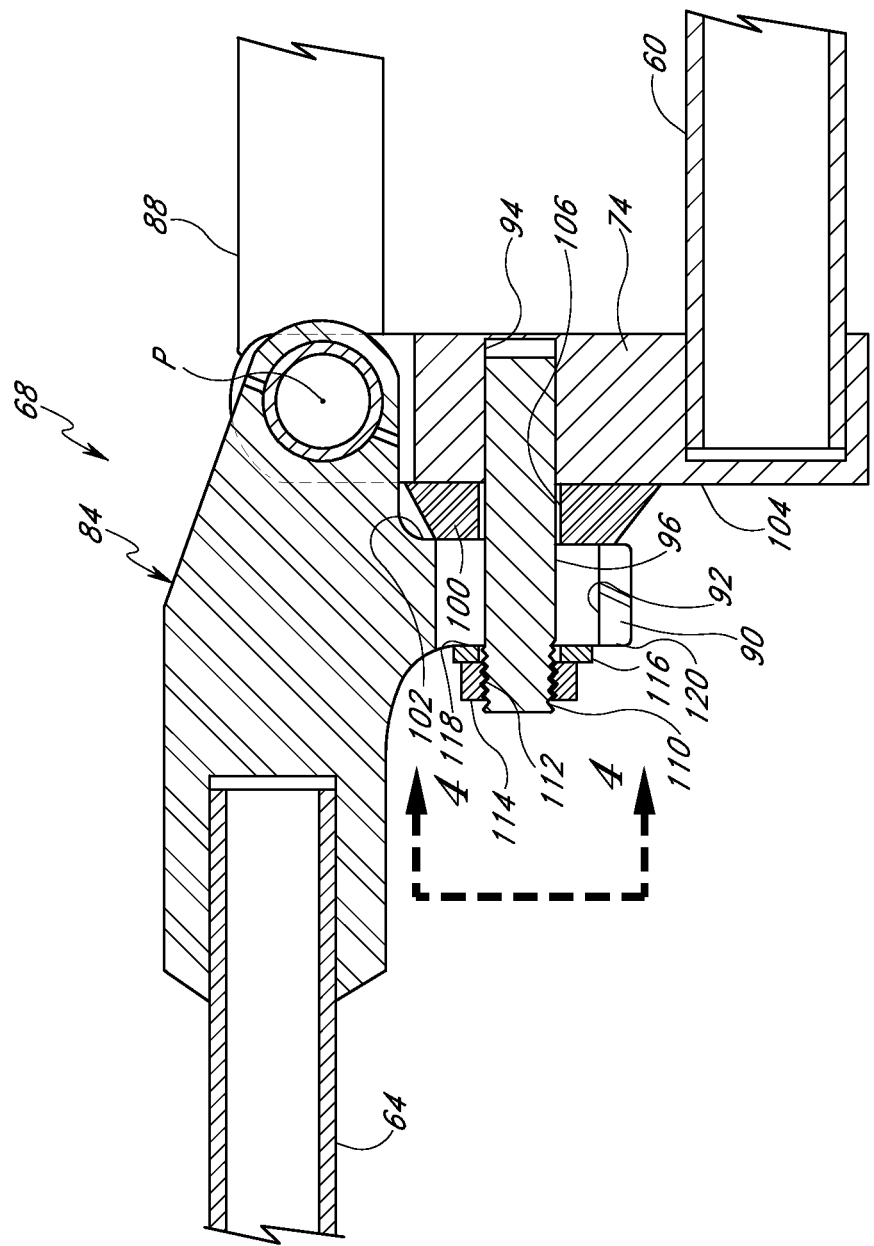
FIG. 3 is a cross-section of the left pivot assembly and portion of the clamp tube and left handgrip portion.

With additional reference to FIG. 3, the left pivot assembly 68 is illustrated in section. Although not specifically shown, preferably the right pivot assembly 66 is constructed substantially the same as the left pivot assembly 68. Desirably each pivot assembly, 66, 68 includes a support 74 fixed to the respective end of the clamp tube 60. The support 74 may be connected to the clamp tube 60 by any suitable arrangement, such as interlocking threads, a press-fit arrangement, or welding, for example. Desirably, the support 74 extends upward and terminates in front and rear protruding portions 76, 78, which define a space, or channel, therebetween. In the illustrated arrangement, each of the protruding portions 76, 78 includes an aperture 80 arranged such that an opening of each aperture 80 faces the channel defined by the protruding portions 76, 78. The apertures 80 are aligned with one another for receiving opposing ends of a support shaft 82.

Desirably, each pivot assembly 66, 68 includes a pivot body 84, which supports the respective handgrip portion 62, 64. The handgrip portions 62, 64 may be secured to the respective pivot body 84 by any suitable arrangement, including interlocking threads, a press-fit arrangement, or welding, for example. A portion of the pivot body 84 is sized and shaped to fit within the channel defined by the support 74 and includes an aperture 86 which permits the pivot body 84 to be rotatably supported by the support shaft 82. Accordingly, the pivot body 66 supports the respective handgrip portion 62, 64 for arcuate motion about a pivot axis P defined by the shaft 82. Preferably, the pivot axis P is oriented substantially perpendicular to the axis of the clamp tube 60, referred to herein as the "handlebar axis" and designated by the reference character "H". Although not specifically illustrated herein, the support shaft 82 may include one or more grooves configured to receive a seal member, such as an O-ring, to inhibit dirt or other foreign materials from entering between the shaft 82 and the pivot body 84 or support 74.

As described above, such an arrangement inhibits forward or rearward movement of the handgrip portions 62, 64. In contrast to one-piece handlebars described above, such an arrangement advantageously provides a solid feel to the handlebar assembly 28 when the rider is pulling in a rearward direction, such as during acceleration of the motorcycle 10, without compromising the amount of shock absorbing (i.e., substantially downward) movement that is provided.

In addition, the illustrated arrangement allows shock absorbing movement of the handgrip portions 62, 64, without significantly altering the angular position of the rider's wrists throughout the range of motion of the handgrip portions 62, 64. In contrast, shock absorbing motion of the handgrip portions occurring about an axis parallel to the axis of the handlebar would also cause rotation of the rider's wrists. On most motorcycles and atv's the throttle is controlled by rotation of a handgrip assembly. Accordingly, with such an arrangement, rotation of the rider's wrist due to shock absorbing movement of such a handlebar assembly would also cause unintended and undesirable changes in throttle position.

Preferably, a brace, or crossbar 88, extends from an upper end of the left support 74 to an upper end of the right support 74 to add rigidity to the handlebar assembly 28. The crossbar 88 may be of any suitable shape, however, desirably the crossbar 88 is substantially rectangular in cross-section. In a preferred arrangement, forward ends of each pivot support shaft 82 are exposed from the supports 74 and include an annular groove 87. The crossbar 88 includes an aperture at each end, which accommodate the exposed ends of the shaft 82. Thus, the crossbar 88 is supported on the exposed ends of the shafts 82 and an clip member, or C-clip 89, is positioned within the annular groove 87 of the shaft 82 to secure the crossbar 88 in place. Alternatively, threaded fasteners may be used to secure the crossbar 88 to the pivot assemblies. Further, the crossbar 88 may assume other shapes and/or may be connected to the handlebar assembly 28 by other suitable methods.

With the preferred arrangement, the crossbar 88 interconnects the right and left supports 74 and is spaced from the clamp tube 60 (and handlebar axis H) in the vertical direction. Desirably, the crossbar 88 is substantially at the same height, relative to the clamp tube 60, as the pivot axes P. Advantageously, with such an arrangement, the crossbar 88 substantially prevents outward flexing of the supports 74, due either to deflection of the support 74 or the clamp tube 60, in response to a downward force being applied to the handgrip portions 62, 64. Accordingly, movement of the handgrip portions 62, 64 may be primarily controlled by the shock absorbing arrangements described below, rather than by undesired flexing of the clamp tube 60 or supports 74.

As mentioned above, preferably a shock absorbing arrangement is associated with each handgrip portion 62, 64 to provide a force tending to resist downward movement of the handgrip portions 62, 64. With additional reference to FIG. 4, the shock absorbing arrangement is described in greater detail. Desirably, each pivot body 84 includes a flange portion 90 extending in a downward direction from an intermediate portion of the pivot body 84 generally perpendicular to both the clamp tube 60 and the handgrip portions 62, 64. An elongated aperture 92 extends through the flange in a horizontal direction and is generally aligned with the handlebar axis H.

The support 74 includes an aperture 94 for supporting a shaft 96, which extends generally horizontally in a lateral direction from the support 74. Desirably, the shaft 96 is positioned below the pivot axis P and passes through the elongated aperture 92 of the flange 90. The elongated shape of the aperture 92 accommodates arcuate movement of the pivot body 84 and handgrip portions 62, 64 relative to the shaft 96, which remains stationary.

A shock absorbing member 100 is positioned between and contacts an inner surface 102 of the flange 90 and an outer surface 104 of the support 74 when the handgrip portions 62, 64 are in a relaxed position. Thus, the shock absorbing member 100 tends to bias the pivot body 84, and the respective handgrip portion 62, 64, rotationally upward relative to the support 74 (and clamp tube 60) and supplies a force tending to resist rotationally downward movement of the handgrip portions 62, 64. Preferably, the shaft 96 is spaced between about one and four inches from the handlebar axis H and, more preferably, between about two inches and two and three-quarters inches from the handlebar axis H. Such an arrangement keeps the shaft 96 sufficiently close to the handlebar axis H to inhibit damage, while also permitting a force applied to the handgrip portion 62, 64 to apply an appropriate force, through the flanges 90, to the shock absorbing members 100.

The shock absorbing member 100 desirably comprises a material that provides a resistive force in response to compression, such as an elastomeric material, for example. Preferably, the shock absorbing member 100 is annular in plan view and substantially rectangular in cross sectional shape. The member 100 desirably is positioned such that one end is adjacent the inner surface 102 of the flange 90 and the opposite end is adjacent the outer surface 104 of the support 74. Preferably, the shock absorbing member 100 includes a central aperture 106 that permits the member 100 to be supported on the outwardly extending shaft 96.

Although the illustrated embodiment includes a shock absorbing member 100 for each pivot assembly 66, 68, other arrangements wherein a single shock absorbing member, are utilized to provide a biasing force for both pivot assemblies 66, 68 and thus both handgrip portions 62, 64. In addition, other type of shock absorbing arrangements may also be used. For example, a hydraulic shock absorber assembly may be used in place of the elastomeric member 100.

Figure 4:
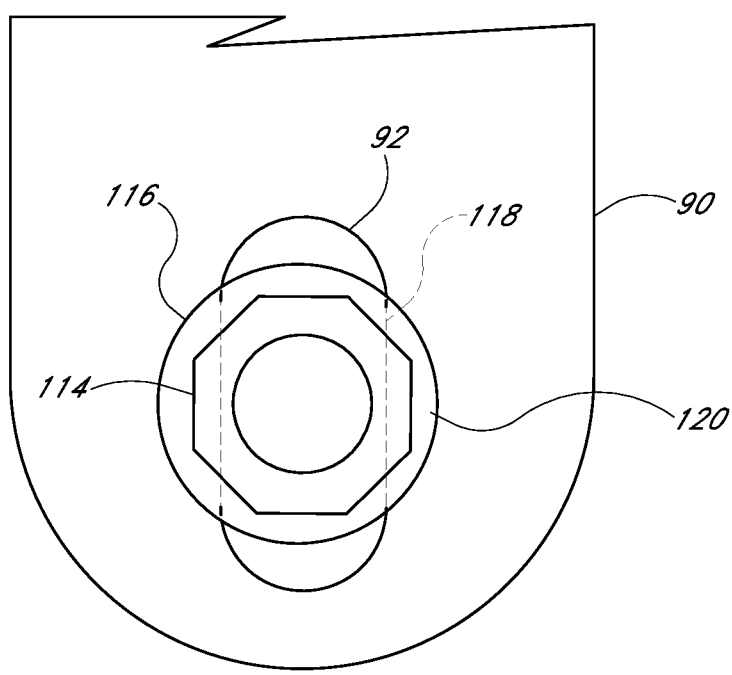
FIG. 4 is a plan view of a lower flange portion of the left pivot assembly taken along the view line 4-4 of FIG. 3.

Desirably, each pivot assembly 66, 68 includes a stop arrangement to limit rotationally upward movement of the handgrip portions 62, 64. In the illustrated embodiment, an outer end of the shaft 96 includes external threads 110 that mate with internal threads 112 of a nut 114. The nut 114 supports a washer 116 in a fixed position along the length of the shaft 96. With reference to FIG. 4, portions of an inner surface 118 of each washer contacts a portion of the outer surface 120 of the flange 90 on each side of the aperture 92 to limit upward rotation of the pivot body 84. Thus, upward rotation of the respective handgrip portion, 62, 64 is also limited. Accordingly, the stop arrangement defines the normal, or relaxed, position of the handgrip portions 62, 64 relative to the clamp tube 60. Furthermore, the stop arrangement may limit, or prevent, upward movement of the handgrip portions 62, 64 beyond the normal position. Accordingly, the rider is provided with a solid feel to the handlebar 28 when pulling in and upward direction.

Figure 5:
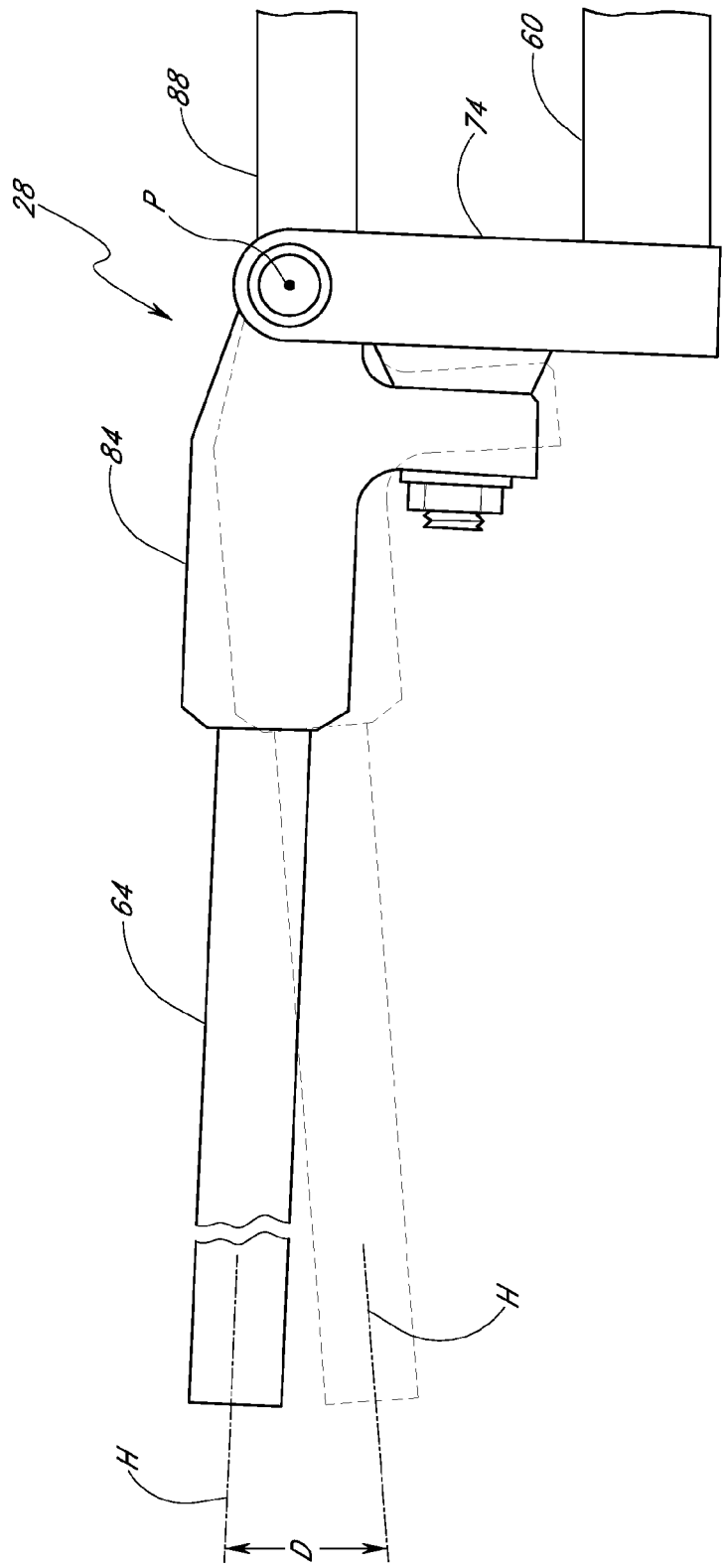
FIG. 5 is a schematic representation of the left side of the handlebar illustrating arcuate, shock absorbing movement of the left handgrip portion.

With reference to FIG. 5, the left handgrip portion 64 is shown in both a relaxed position (solid lines) wherein the shock absorbing member 100 is biasing the flange 90 into contact with the washer 116 and a compressed position (phantom lines) wherein the handgrip portion 64 has moved rotationally downward to absorb impact forces resulting from the motorcycle 10 traversing rough terrain or landing from a jump. As described above, preferably the handgrip portion 64 moves from the relaxed position to the compressed position through an arcuate path about the pivot axis P. Such movement absorbs forces and vibrations that would otherwise be transmitted to a rider of the motorcycle 10.

Shock absorption is provided by the shock absorbing member 100 being compressed between the pivot body 84 and the support 74, which reduces the shock to the hands and arms of the rider that would otherwise result from forces that are not absorbed by the suspension assemblies 18, 20 of the motorcycle 10. Advantageously, the amount of movement of the ends of the handgrip portion 64 (i.e., where the rider would normally grip the handlebar 28) is greater than the amount possible with the bending, cantilever movement of a conventional, one-piece handlebar. Desirably, the ends of the handgrip portion 64 moves a travel distance D, measured as a linear distance in a substantially vertical direction, of at least one-half inch and, preferably, at least about one inch, in order to provide an advantageous degree of shock absorption. Conversely, if the travel distance D is too large, movement of the handgrip portion 64 while riding may feel unnatural to the rider. Accordingly, it is preferred that the travel distance D is less than about two inches. The range of travel distances D provided above is presently preferred for a typical off-road motorcycle application. However, other travel distances D are possible, and may be preferred in other applications.

The pivot axis P is generally aligned in the lateral direction with the ends of the clamp tube 60 in the illustrated embodiment. Desirably, with such an arrangement, the pivot axis P of the right pivot assembly 66 and the pivot axis P of the left pivot assembly 68 are spaced between about six and twelve inches apart. Preferably, the pivot axes P are spaced about seven and one-half to ten inches apart and, more preferably, about nine and three-sixteenths inches apart. The provision of two separate pivot locations being spaced from one another, as described above, provides a desirable diameter to the arc of rotation for the handgrip portions 62, 64. Conversely, when a single pivot is used, or when the pivots are too close together, the handgrip portions 62, 64 move through an arc of a larger diameter. This results in movement of the handgrip portions that is more noticeable to the rider and, if large enough, may result in the rider's wrist assuming an unnatural position.

Although the above-described arrangement is preferred, other positions of the pivot axis P, with respect to one another and/or the handlebar axis H, may also be utilized. In addition, as will be appreciated by one of skill in the art, the handgrip portion 64 may be configured to move to a lesser, or greater, degree than illustrated in FIG. 5, depending on the type of shock absorbing member 100 selected, the relative distance between the member 100 and the pivot axis P, or alternative configurations of the pivot assembly 66. Although not separately illustrated, desirably, the right pivot assembly 66 is constructed substantially the same as the left pivot assembly 68.

Advantageously, the illustrated arrangement permits adjustment of a height of the handgrip portions 62, 64 relative to the clamp portion 60, when in a relaxed position of the handlebar assembly 28. Such a feature permits adjustment of the handlebar assembly 28 to suit riders of differing size, individual rider preference, or specific riding conditions. Desirably, height adjustment is achieved by movement of the nut 114 relative to the shaft 96.

Figure 6:
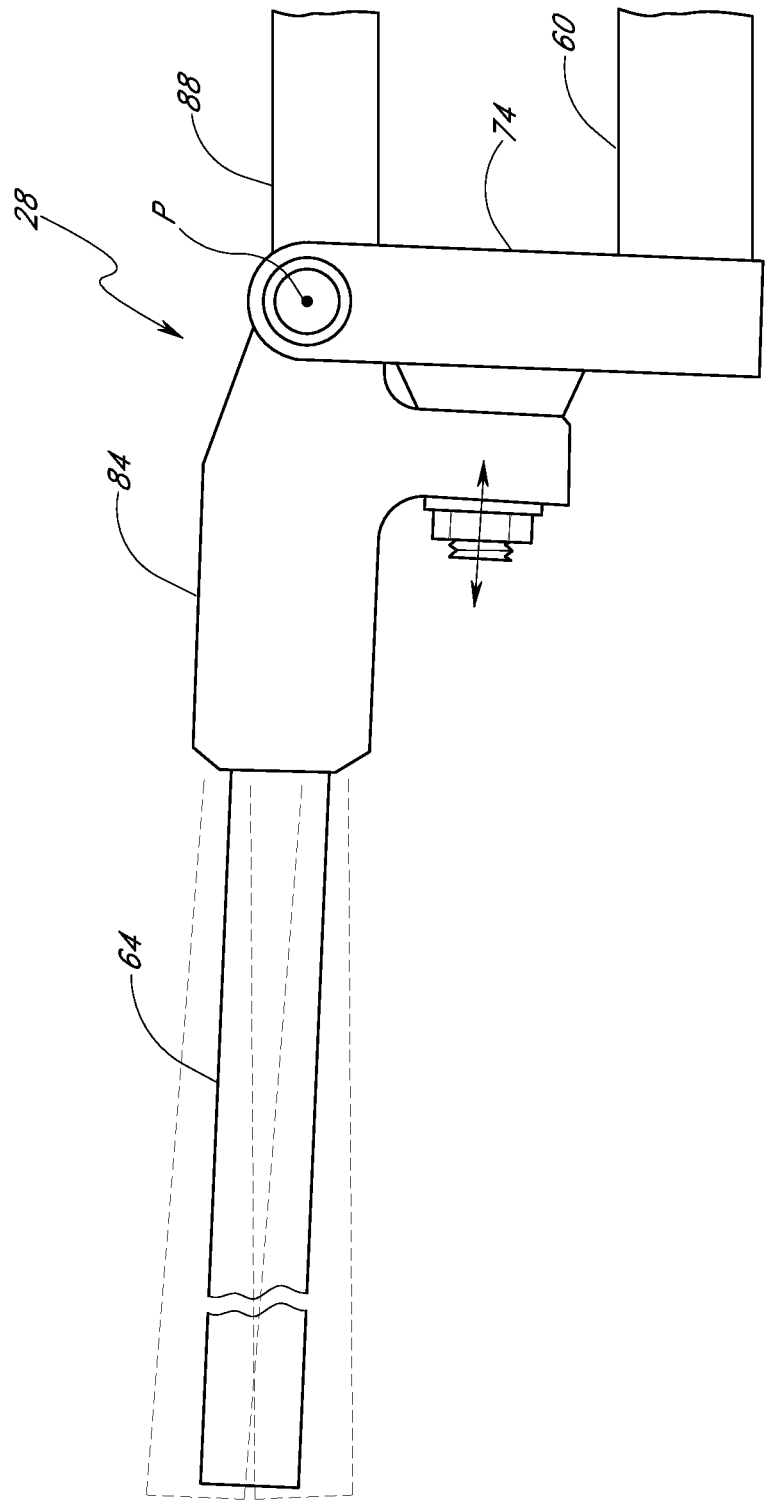
FIG. 6 is a schematic representation of the left side of the handlebar assembly illustrating adjustment of a relaxed height of the left handgrip portion.

For example, movement of the nut 114 outwardly with respect to the shaft 96 permits the pivot body 84 (and handgrip portion 62, 64) to rotate farther upward before contacting the washer 116. Conversely, inward movement of the nut 114 relative to the shaft 96 causes the outer surface 120 of the flange 90 to contact the washer 116 in a rotationally lower position and, therefore, lowers the relaxed height of the handgrip portion 62, 64 relative to the clamp portion 60. Adjustment of the relaxed height of the handgrip portions 62, 64 is illustrated in phantom in FIG. 6. As described above, the shock absorbing members 100 operate to bias the handgrip portions 62, 64 into their uppermost, relaxed positions, absent a downward force due to the motorcycle 10 traversing rough terrain or landing from a jump, for example.

Advantageously, the nut 114, which operates as the adjustment mechanism for the height adjustment of the handgrip portions 62, 64 in the illustrated embodiment, is easily accessible. Preferably, the engagement surface (peripheral surface) of the nut 114 is exposed such that the axial position of the nut 114 may be easily adjusted without disassembly of the handlebar assembly 28. Such an arrangement allows adjustment to the height of the handgrip portions 62, 64 to be accomplished quickly and easily. In an alternative arrangement, the nut 114 may be modified, or replaced by another mechanism, to provide an engagement surface that permits adjustments to be made by hand, without the use of tools.

The above-described embodiment of the handlebar assembly 28 is preferred due to a number of advantages. For example, the illustrated arrangement is relatively lightweight and is capable of being manufactured at a reasonable cost. Furthermore, the pivot assemblies 66, 68 are arranged to minimize the possibility of damage during a crash. Advantageously, the shock absorbing arrangement (flange 90, shaft 96, nut 114, washer 118 and shock absorbing member 100) is positioned between the respective handgrip portion 62, 64 and the clamp tube 60 in the vertical direction. Such an arrangement positions the shock absorbing arrangement so that it is protected from damage by the pivot body 84 and support 74. In addition, the positioning of the shock absorbing arrangement provides a clean, unobtrusive appearance to the handlebar assembly 28. Furthermore, the provision of two separate pivot assemblies 66, 68 permits each handgrip portion 62, 64 to be easily replaced if damaged during a crash.

Although the illustrated embodiment is preferred for at least the reasons presented above, nonetheless, other variations are also possible. For example, providing a clamp tube 60 as described herein permits the handlebar assembly 28 to replace conventional handlebars using standard mounting arrangements. However, other methods of connecting the present handlebar assembly 28 to the motorcycle 10 may also be used, such as integrating the pivot assemblies 66, 68 with the upper fork clamp 24, for example. Furthermore, other arrangements to permit shock absorbing motion of the handgrip portions 62, 64 are also possible. For example, the pivot assemblies 66, 68 may be positioned in other locations or may share one or more individual components, as will be appreciated by one of skill in the art.

Although the present invention has been described in the context of a preferred embodiment, it is not intended to limit the invention to the provided example. Modifications to the above-described handlebar assembly apparent to one of skill in the art are considered to be part of the present invention. Accordingly, the invention should be defined solely by the appended claims.

What is claimed is:
1. A vehicle steering control assembly, comprising:
a mounting portion that is connectable to a steering system of a vehicle and is rotatable about a steering axis to permit steering of the vehicle;
a first pivot assembly supported by said mounting portion and comprising a pair of spaced-apart upward protrusions defining a channel therebetween, each of said protrusions having an aperture, a first support shaft defining a first pivot axis, said first support shaft received within said apertures of said protrusions such that said first pivot axis is spaced above an uppermost surface of said mounting portion;

a second pivot assembly supported by said mounting portion and comprising a pair of spaced-apart upward protrusions defining a channel therebetween, each of said protrusions having an aperture, a second support shaft defining a second pivot axis, said second support shaft received within said apertures of said protrusions such that said second pivot axis is spaced above an uppermost surface of said mounting portion;

a crossbar connecting said first pivot assembly and said second pivot assembly, said crossbar positioned outside of said channels of said first and second pivot assemblies;

a first handgrip portion supported on said first pivot assembly and spaced outwardly from said mounting portion, said first handgrip portion substantially constrained to arcuate movement relative to said mounting portion about said first pivot axis;

a second handgrip portion supported on said second pivot assembly and spaced outwardly from said mounting portion, said second handgrip portion substantially constrained to arcuate movement relative to said mounting portion about said second pivot axis;

a first shock absorber configured to provide a force resisting movement of said first pivot assembly about said first pivot axis by compressing in response to movement of said first pivot assembly;

a second shock absorber configured to provide a force resisting movement of said second pivot assembly about said second pivot axis by compressing in response to movement of said second pivot assembly;

a first stop configured to define a relaxed position of said first pivot assembly; and a second stop configured to define a relaxed position of said second pivot assembly.

2. The steering control assembly of claim 1, wherein said first and second stops are adjustable to adjust said relaxed position of said first and second pivot assemblies, respectively, relative to said mounting portion.

3. The steering control assembly of claim 1, wherein said first pivot assembly is rotatable about said first pivot axis independent of said second pivot assembly and said second pivot assembly is rotatable about said second pivot axis independent of said first pivot assembly.

4. The steering control assembly of claim 3, wherein said first handgrip portion is movable about said first pivot axis independent of said second handgrip portion and said second handgrip portion is movable about said second pivot axis independent of said first handgrip portion.

5. The steering control assembly of claim 1, wherein said first shock absorber is responsive to movement of said first handgrip portion independent of said second handgrip portion and said second shock absorber is responsive to movement of said second handgrip portion independent of said first handgrip portion.

6. The steering control assembly of claim 1, wherein each of said first and second shock absorbers comprises an elastomeric material.

7. The steering control assembly of claim 1, wherein said first pivot assembly comprises a first pivot body and said first handgrip portion is connected to said first pivot body by a welded joint, and wherein said second pivot assembly comprises a second pivot body and said second handgrip portion is connected to said second pivot body by a welded joint.

8. The steering control assembly of claim 1, wherein each of said first and second shock absorbers is an annular, resilient member that is interposed between said mounting portion and a respective one of said first and second pivot assemblies.

9. The steering control assembly of claim 8, wherein each of said first and second stops comprises a nut that is movable on a threaded shaft.

10. The steering control assembly of claim 9, wherein each of said first and second shock absorbers surrounds a respective one of said threaded shafts.

11. The steering control assembly of claim 1, wherein said pair of spaced-apart protrusions of said first pivot assembly comprise forward and rearward protrusions, and wherein said pair of spaced-apart protrusions of said second pivot assembly comprise forward and rearward protrusions.

12. The steering control assembly of claim 11, wherein said crossbar is located in front of said forward protrusions of said first and second pivot assemblies.

13. The steering control assembly of claim 12, wherein each of said first and second support shafts comprise forward portions extending forward of said forward protrusions of said first and second pivot assemblies, and wherein said crossbar is supported on said forward portions of said first and second support shafts.

14. The steering control assembly of claim 1, wherein each of said first and second support shafts comprise mounting portions extending outside a respective one of said channels of said first and second pivot assemblies, and wherein said crossbar is supported on said mounting portions of said first and second support shafts.

15. The steering control assembly of claim 1, wherein said mounting portion is a tube having an axis, wherein said first and second pivot assemblies are spaced from one another along said axis.

16. The steering control assembly of claim 15, wherein said first and second pivot assemblies are located at first and second ends of said tube, respectively.

17. The steering control assembly of claim 16, wherein said first and second pivot assemblies are spaced apart from one another by at least six inches.

* * * * *